Figure 1:
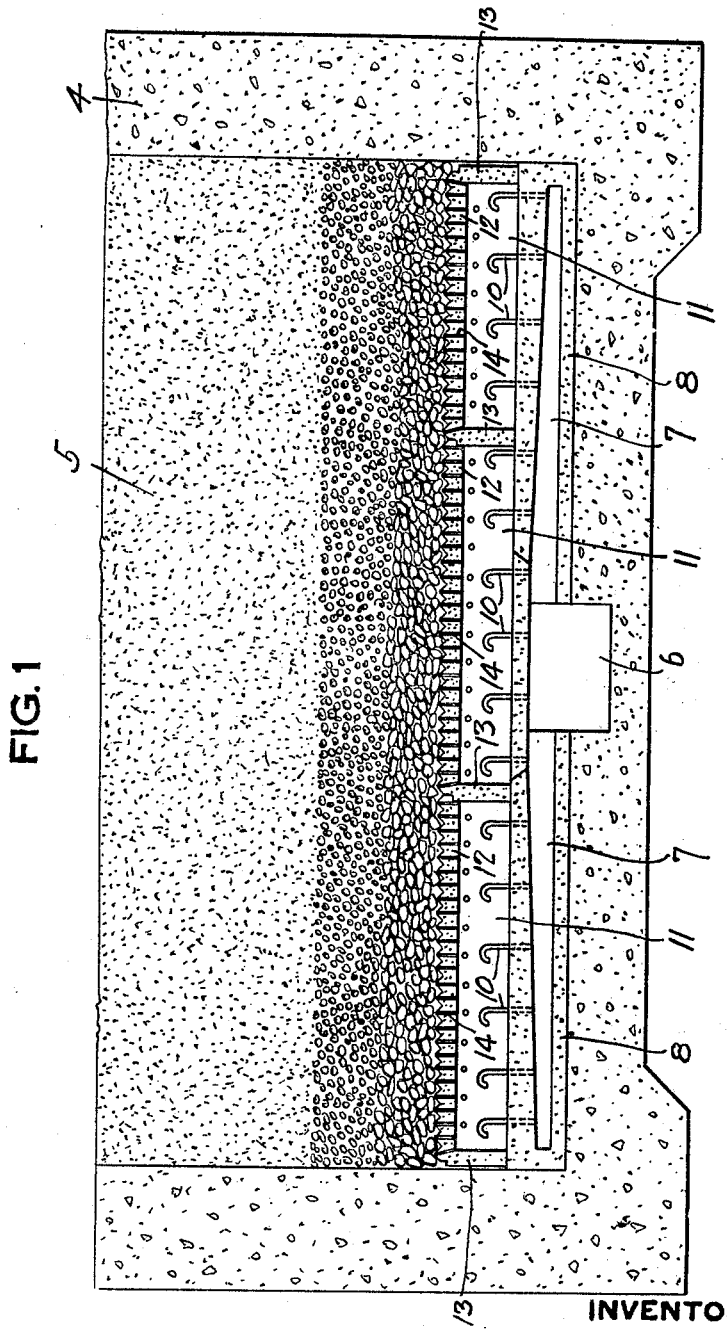

Feb. 9, 1926.

F. B. LEOPOLD 1,572,398

FILTERING APPARATUS

Filed May 12, 1924          2 Sheets-Sheet 1

INVENTOR
Frederick B. Leopold,
By Kay, Totten & Brown,
Attorneys

Feb. 9, 1926.

F. B. LEOPOLD

FILTERING APPARATUS

Filed May 12, 1924

1,572,398

2 Sheets-Sheet 2

INVENTOR
Frederick B. Leopold
By Kay, Totten & Brown,
Attorneys

Patented Feb. 9, 1926.

1,572,398

UNITED STATES PATENT OFFICE.

FREDERICK B. LEOPOLD, OF PITTSBURGH, PENNSYLVANIA.

FILTERING APPARATUS.

Application filed May 12, 1924. Serial No. 712,625.

*To all whom it may concern:*

Be it known that I, FREDERICK B. LEOPOLD, a citizen of the United States, and resident of Pittsburgh, in the county of Allegheny and State of Pennsylvania, have invented a new and useful Improvement in Filtering Apparatus; and I do hereby declare the following to be a full, clear, and exact description thereof.

My invention relates to filtering apparatus and particularly to means for effecting a uniform distribution of flow through a filter bed.

Heretofore difficulty has been experienced in effecting proper distribution of the flow of wash water through a filter bed of sand and gravel, the usual practice being to reverse the flow through the filter at frequent intervals to loosen and carry off the sludge deposited in the filter bed. In backwashing, the tendency is for the flow to concentrate at points in the filter bed where the resistance thereto is relatively weak owing to the variation in density or tenacity of the filter bed by reason of certain portions thereof becoming more clogged with sediment than other portions. Consequently the water breaks through at weaker points and displaces the smaller particles of gravel adjacent thereto and builds it up into mounds that extend to the surface of the sand. A relatively free passage for raw water thereafter supplied to the filter is thus afforded, and a considerable portion thereof will pass through the filter bed without depositing the sediment contained therein.

Various attempts have been made to insure uniform flow of wash water through a filter, as by placing shields or deflectors above the bottom of the filter tank or by providing branch lines through which the water is conveyed to separated points at the bottom of the filter bed, but in all of these arrangements the actual distribution of the water through the filter bed is controlled by the gravel in the bottom of the bed, the water being directed through the openings between the particles of gravel in a rather uncertain manner. It will be apparent that when a line of weak resistance is established in the gravel bed subsequent washing will increase the rupture at such line and the filter bed will become increasingly ineffective at each repeated washing, and this abnormal condition may be present for a considerable period of time before it is finally discovered and corrected.

One object of my invention is to provide a system wherein a uniform distribution of flow through the filter is insured.

Another object of my invention is to simplify and improve generally the construction and operation of filter beds and the distribution of liquid flow thereto.

Figure 2:
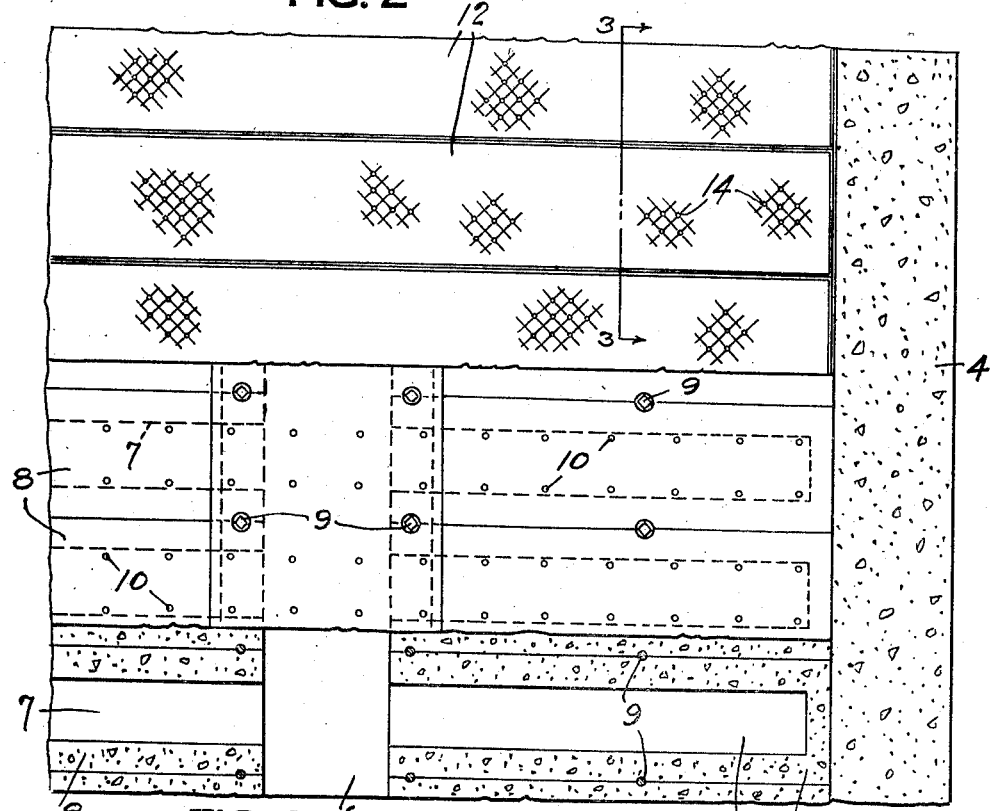
Figure 3:
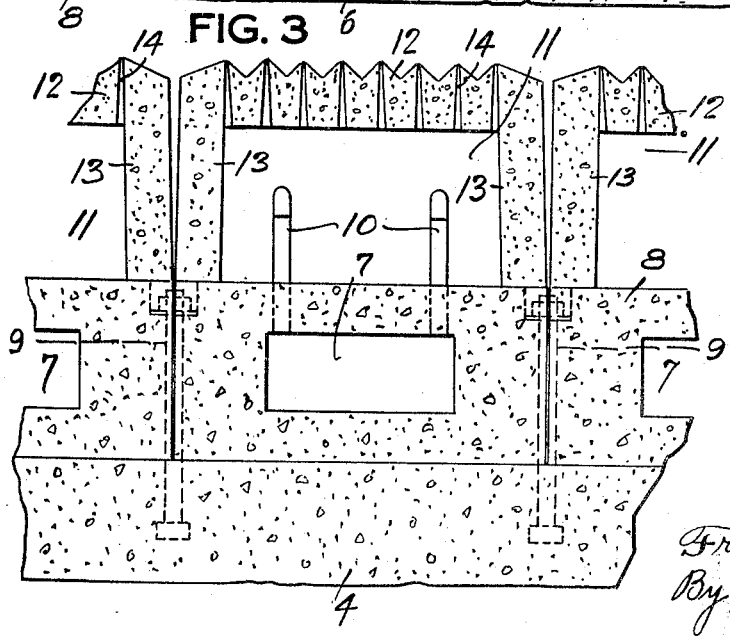

One form which my invention may take is shown in the accompanying drawing wherein Fig. 1 is a sectional view of a portion of filter tank to which my invention has been applied; Fig. 2 is a sectional plan view of the device of Fig. 1 taken at three vertically placed points, and Fig. 3 is a sectional view taken on the line 3—3 of Fig. 2.

My apparatus is shown as applied to a concrete tank 4, only the lower portion of which is shown in Fig. 1. Within this is found the usual filter bed 5 composed of sand and gravel.

Disposed longitudinally of the tank 4 is a collecting flume or conduit 6 through which filtered water flows when leaving the tank and through which wash water is drawn in the reverse direction when it is desired to wash the filter bed by back-flow therethrough.

Extending laterally from the collecting flume are a plurality of tributary flumes or branches 7 formed in a slab 8 of concrete or other suitable material. It will be noted (Fig. 1) that the branches 7 taper towards their ends, so that uniform pressure will be maintained in each throughout its length when liquid is flowing through the passages leading therefrom. The slab 8 is anchored to the tank by bolts 9.

A plurality of pipes 10 are embedded in the slab 8 and afford communication between the passages 7 and chambers located thereabove, which will be hereinafter described. Each tributary passage 7 is provided in the present instance, with two rows of pipes 10 throughout substantially its entire length.

One or more chambers 11 are disposed above each of the tributary passages 7, these chambers being formed by inverting troughs or recessed blocks 12 over groups of pipes 10. The blocks 12 are formed of concrete or other suitable material and are provided with side and end walls 13. The blocks are each provided with a plurality of tapered openings 14 through which water may pass from the filter bed to the chambers 11 or from such chambers to the filter bed, the tapering construction serving to reduce the tendency of the openings 14 to become clogged by material from the filter bed. The combined area of the openings 14 at their upper ends is greater than the sum of the areas of the passages through the pipes 10, and the openings 14 are preferably uniformly distributed throughout the tops of the blocks 12. The main conduit 6 and the lateral conduit 7 together constitutes what may be termed the primary distribution system, while the chambers 11 and passages 14 form the secondary system. Each section of the secondary system is a unit in itself and has no direct communication with the other portions of the secondary system, and the combined areas of the outlets from the chambers 11 to the filter bed is so proportioned with respect to the area of the passages leading to the primary system that the velocity of flow from the primary system is so reduced that it is insufficient to disturb the gravel located adjacent to the bottom of the filter bed and the velocity of backflow through the filter bed will therefore not be so great at any one point as to cause a break in the filter bed.

It will be understood that materials other than concrete may be employed for constructing the various conduits and chambers, and that various changes in detail and general arrangement may be made without departing from the spirit and scope of the invention as defined in the accompanying claims:

What I claim is:

1. The combination with a filter bed, of a water distribution system therefor comprising a main conduit beneath said bed, lateral conduits leading from said main conduit, and a chamber disposed above each of said lateral conduits and having openings communicating with the bottom of the filter bed, the lateral conduits being of decreasing area from said main conduit and provided with a plurality of passages throughout their lengths for effecting communication between said lateral conduits and their associated chambers, the combined areas of the said openings being greater than the area of said passages.

2. The combination with a filter bed, of a distribution system therefor comprising a main channel, lateral channels leading from said main channel, chambers disposed above said lateral passages and said main channel, tubes leading from said passages to the said chambers and having their upper ends bent downwardly, and means providing communication between said chambers and the filter bed.

3. The combination with a filter bed, of a distribution system therefor comprising a main channel, lateral channels leading from said main channel, chambers disposed above said lateral passages and said main passage, means affording communication between said passages and the said chambers, and means providing communication between said chambers and the filter bed, the said last means comprising passages tapering upwardly and having a total cross sectional area at their upper ends greater than the area of the openings leading into said chambers from said passages.

In testimony whereof I, the said FREDERICK B. LEOPOLD, have hereunto set my hand.

FREDERICK B. LEOPOLD.